US007493021B2

(12) United States Patent
Larson et al.

(10) Patent No.: US 7,493,021 B2
(45) Date of Patent: Feb. 17, 2009

(54) METHOD AND APPARATUS FOR USING CLOSED CAPTIONING DATA TO IDENTIFY TELEVISION PROGRAMMING CONTENT FOR RECORDING

(75) Inventors: David Anthony Larson, Rochester, MN (US); Bryan Mark Logan, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 11/089,471

(22) Filed: Mar. 24, 2005

(65) Prior Publication Data
US 2006/0215991 A1    Sep. 28, 2006

(51) Int. Cl.
*H04N 5/91* (2006.01)
(52) U.S. Cl. ...................................... 386/83
(58) Field of Classification Search ............ 386/46, 386/83, 69, 95; 725/114, 115
See application file for complete search history.

(56) References Cited

U.S. PATENT DOCUMENTS

| 4,857,999 | A | 8/1989 | Welsh |
| 5,481,296 | A | 1/1996 | Cragun et al. |
| 5,561,457 | A | 10/1996 | Cragun et al. |
| 5,859,662 | A | 1/1999 | Cragun et al. |
| 6,430,357 | B1* | 8/2002 | Orr .............................. 386/69 |
| 6,901,207 | B1* | 5/2005 | Watkins ....................... 386/83 |
| 7,046,914 | B2* | 5/2006 | Jasinschi et al. .............. 386/95 |
| 2003/0154493 | A1* | 8/2003 | Kagle et al. ................. 725/114 |

* cited by examiner

*Primary Examiner*—Thai Tran
*Assistant Examiner*—Mishawn Dunn
(74) *Attorney, Agent, or Firm*—Roy W. Truelson

(57) ABSTRACT

A television video recorder controlled by a viewer automatically compares a closed captioning stream from a current program instance with one or more respective closed captioning streams associated with previously recorded program instances to determine whether the current instance matches a previously recorded instance. If the closed captioning streams match, it is assumed that the current instance is a duplicate of a previously recorded instance, and the video recorder automatically takes an appropriate action with respect to recording at least one program instance. Preferably, one of the program instances is automatically deleted, so that there are no duplicates. Alternatively, the recorder might delete or mark from the saved program instance any portions thereof which do not match corresponding portions of a duplicate program instance, on the assumption that such portions are commercial advertisements.

7 Claims, 8 Drawing Sheets

METHOD AND APPARATUS FOR USING CLOSED CAPTIONING DATA TO IDENTIFY TELEVISION PROGRAMMING CONTENT FOR RECORDING

FIELD OF THE INVENTION

The present invention relates to television, and in particular to the design and operation of devices which record selective television signals for later viewing by a user.

BACKGROUND OF THE INVENTION

Television has become the world's predominant communications medium. The variety of programming available to the average television viewer has mushroomed in recent years with the growth of cable and satellite networks. It is now possible for a typical viewer to receive 100 channels or more in his home, including news, serials, movies, educational and other programming of almost every type.

Despite the variety of programming available, one of the drawbacks to television, from the viewer's perspective, is the fact that programs are broadcast on a common medium, i.e., programs are presented at fixed times to a large number of viewers. Not all users will find the scheduled time of a particular program of interest to be convenient. In the early days of television, it became common for many viewers to arrange their personal schedules in conformity with the television schedule, so as to be home and otherwise unoccupied when a favorite program was being broadcast. Since that time, it has become possible to record a favorite television program on a video recording device under the control of the viewer. Relatively inexpensive personal use video cassette recorders (VCRs) using magnetic tape cassettes have been available for this purpose for at least 20 years, and more recently other forms of personal video recording devices, such as recording devices using digital versatile disks (DVDs) or rotating magnetic hard disk drives, have become available.

Although personal video recording devices are generally available, may viewers find it cumbersome to pre-program these devices to record their favorite programs. For example, the viewer may be required to consult a television listing schedule (which is subject to change) to find the time and channel of the program in advance, and to program the device (using an interface which is often less than easy to use). Either out of habit, or because of the difficulty of programming, many viewers either simply watch whatever is being broadcast at a particular time, or arrange their own schedules in accordance with the broadcast schedule.

In order to improve the interface and make it easier for viewers to record their favorite programs, some broadcasters provide additional information and recording services to assist the viewer. An example of such a service is the TIVO™ service. When using such a service, an electronically encoded version of a television schedule is distributed to the viewer. The schedule contains electronic entries with respect to each of various programs. The entry may contain information such as show start time and length, channel, title, episode number, episode title, debut data, description, rating, etc. A recording device is often, although not necessarily, provided with the service.

The electronically encoded scheduling information can be used by the view to select programs for recording. In a simple implementation, the viewer may select a single instance of a scheduled program for recording, and the recording device will record whatever is broadcast on the channel and at the time specified in the scheduling entry. Some services offer more sophisticated recording options to the viewer. For example, if a viewer has a favorite serial program, the viewer may select all programs having a particular title for recording. Using such a feature, the recording device will automatically find all instances of such a program, without requiring the user to specify each such instance individually.

Where the user elects to record all instances of a serial program, there is a possibility that multiple versions of the same episode will be recorded. As is well known, it is common for the same episode to be broadcast on different channels, or to be re-broadcast on the same channel at a different time. In at least one such service, it is possible to specify that the recording device record only those episodes which have not been previously recorded. When this option is specified, the recording device compares the episode title and/or episode number of a scheduled program (from the electronically encoded scheduling information) with those episodes already recorded, and if the episode has already been recorded during some pre-defined interval, then it will not be recorded again.

Unfortunately, the electronically encoded scheduling data often does not contain a complete description of a program entry, and in particular may contain only a generic title of the serial program, without an episode title, episode number, or other information from which the particular episode can be identified. In these instances, the recording device can not determine whether a particular instance of the program has already been recorded, and so it will generally record the program instance. Because many serial programs are broadcast and re-broadcast multiple times, the recording device can consume significant storage space re-recording episodes which have already been recorded. Although it is possible for the viewer to manually delete duplicate episodes, manual deletion imposes additional burdens on the viewer.

In these instances and others, it would be desirable to provide an automated technique for determining whether a particular instance of a television program has been previously recorded by a video recording device under control of the viewer, and automatically taking some action with respect to recording a program according to the determination made.

SUMMARY OF THE INVENTION

A video recording device for recording television programs under the control of a viewer automatically compares at least a portion of a closed captioning stream from an instance of a broadcast program with one or more respective closed captioning streams associated with other (typically previously recorded) program instances to determine whether the program instance being compared matches another program instance, such as a previously recorded program instance. If the closed captioning streams match according to some pre-established criterion or criteria, it is assumed that the program instance being compared is a duplicate of another program instance. In this case, the video recording device will automatically take an appropriate action with respect to recording at least one of the program instances.

In the preferred embodiment, the video recording device begins recording of a broadcast program instance and continues recording while it makes a determination whether the program instance is a duplicate. The determination may take some time, depending on the pre-established criteria, during which recording continues. If it is determined that the program instance is a duplicate, the video recording device automatically discontinues further recording of the program instance, and deletes any portion which has already been recorded. However, the action taken upon determining that a program instance is a duplicate may vary. For example, the video recording device might alternatively identify the program instance as a duplicate in its internal data storage, without immediately deleting it. If, at some later time, the video recording device requires additional storage space, it could then search for duplicate program instances, and delete any duplicates to free up storage. In a further alternative, the video recording device might save the more recently recorded duplicate program instance, and delete the previously recorded instance. In a further alternative, the video recording device might delete from the saved program instance (or mark for special action) any portions thereof which do not match corresponding portions of a duplicate program instance, on the assumption that such portions are commercial advertisements rather than part of the program. Additional alternative actions are possible.

In the preferred embodiment, the video recording device is used in conjunction with a television information and recording service which provides television scheduling data in an electronically encoded form. The electronically encoded scheduling data is used to select programs to be recorded by the video recording device. The video recording device uses the electronically encoded scheduling data in addition to the method described herein for determining which program instances to record and whether program instances are duplicates. However, in alternative embodiments, a device which determines whether program instances are duplicates as described herein need not be used in conjunction with such electronically encoded scheduling data.

The use of a technique for identifying duplicate instances of television programs, as described herein, reduces the demands on storage in a video recording device and frees the viewer from the burden of determining whether recorded program episodes are duplicates.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
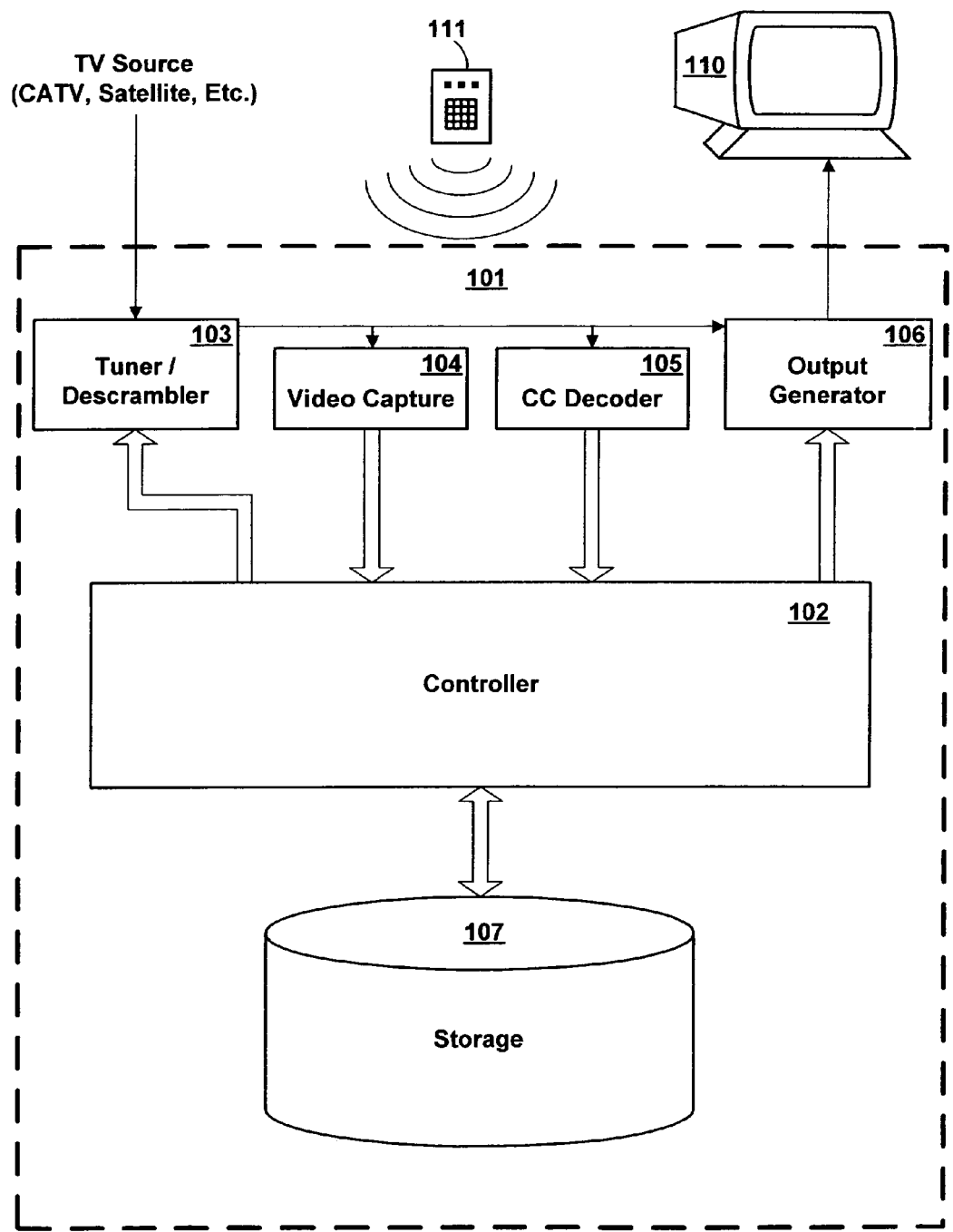
FIG. 1 is a high-level block diagram of a television system for selectively recording one or more television programs, according to the preferred embodiment of the present invention.

Referring to the Drawing, wherein like numbers denote like parts throughout the several views, FIG. 1 is a high level block diagram of a television system 100 for recording selective television programs, according to the preferred embodiment of the present invention. Television system 100 comprises video recording device 101, television display monitor 110, and user input device 111. Television display monitor 110 contains a visual display screen and audio speakers for presenting a television signal to a viewer, using any of various television technologies, now known or hereafter developed. User input device 111 is preferably a hand-held device containing multiple buttons or switches, which communicates with video recording device 101 over an infrared communications link; however, in a generalized sense user input device 111 could be any device providing an interface whereby a user (viewer) can input selections to video recording device; such a device need not employ an infrared link, and it may be implemented as a set of keys or switches integral to video recording device 101, a touch screen integral to television display monitor 110, or in some other form.

Video recording device 101 comprises a central controller 102 which is coupled to tuner/descrambler 103, video capture unit 104, closed captioning text decoder 105, video output generator 106, and storage 107. Controller 102 generally controls the operation of video recording device 101, as explained in further detail herein, and is a special-purpose digital data processing device, i.e., a form of small computer.

Tuner/descrambler 103 (herein referred to as a "tuner") receives a broadcast television signal from an external source, such as a coaxial transmission cable from a cable television network, a satellite receiving dish receiving signals from a satellite, or an antenna receiving atmospheric television transmissions. Tuner 103 demodulates or otherwise extracts a signal corresponding to a specified channel under control of controller 102. Tuner 103 may optionally contain descrambler hardware which converts a signal from a suitable transmission form to a suitable form for use by television display monitor 110. I.e., for transmission, a signal maybe compressed and/or encrypted in accordance with any of various conventional algorithms or algorithms hereafter developed, and descrambler converts the broadcast signal to a signal usable directly by television display monitor 110. In some implementations of the present invention, the received signal will not be scrambled or encrypted, and a descrambler may be unnecessary.

Video capture unit 104 receives one or more television signals output by tuner 103, and converts these signals to a digital format suitable for storage and manipulation by a digital device such as controller 102. If the television signal demodulated by tuner 103 is an analog signal, video capture unit 104 will convert it to digital form. Whether the incoming signal is analog or digital, it may be necessary to convert to a compressed digital form for storage in storage device 106, using any of various video compression algorithms. In some implementations, it may be possible to directly store a signal without conversion or compression.

Closed captioning decoder 105 extracts a stream of closed captioning textual data from the video. signal output by tuner 103, and forwards this stream in digital text form to controller 102. As is known, closed captioning is a technique for carrying textual information regarding a television program in the television signal itself. Closed captioning is primarily intended to carry a textual rendition of the audio portion of a television program for the benefit of hearing impaired individuals, i.e. the dialogue and certain additional sounds. However, a closed captioning stream may carry additional textual information as well. Because closed captioning is intended as an aid to persons with disabilities, it is a legally required portion of a television signal. In the United States, original closed captioning standards specify that the closed captioning stream be carried in line 21 of a vertical blanking interval of a standard television signal. However, closed captioning as herein described applies to any successor standards or analogous standards used in the United States or a different geographical area.

Video output generator 106 drives a television output signal to display monitor 110. Generator 106 selects one of the output of tuner 103 or digital data produced by controller 102 for output, under the control of controller 102. I.e., while output generator 106 normally outputs a television signal from the tuner, it can act as a switch to pre-empt the television signal from the tuner with alternative data. This alternative data could either be a television signal previously received and stored in digitized form in storage 106, or display information (usually text) generated by controller 102. Controller 102 thus uses television monitor 110 as a display output device for displaying information to a viewer, such as menu choices, status information, and so forth. As is known in the art, output generator 106 may completely pre-empt all or a portion of the television signal with display information, or may overlay textual display information on the television signal, or may output the television signal unchanged.

Storage 107 is a mass storage device for storing television data, and may be used for storing other data. In the preferred embodiment, storage 107 is a rotating magnetic hard disk drive data storage device which is integral to video recording device 101. However, storage 107 could alternatively be any of various forms of data storage device, now known or hereafter developed, suitable for storing either analog or digital television signals. Storage 107 may be integral to video recording device 101, or may be contained in a separate recording unit, and may include fixed recording media or removable media, including media that can be written to only once or a limited number of times. Known examples of such devices include conventional magnetic tape housed in removable videocassettes and digital versatile disks (DVDs), as well as semiconductor "flash" memory devices. Where the storage media is of an analog form (e.g., an analog magnetic tape videocassette), the stored television signal may be derived directly from the output of tuner 103, or may be a demodulated input signal which has not been descrambler. Although storage 107 is represented in FIG. 1 as a single storage device, it may in fact be implemented as multiple devices, particularly where removable media is used. For example, storage could include a fixed hard disk drive for storing a limited capacity of programs, and a removable media drive for storing an indefinite capacity of programs beyond the limit of the fixed hard disk drive.

Figure 2:
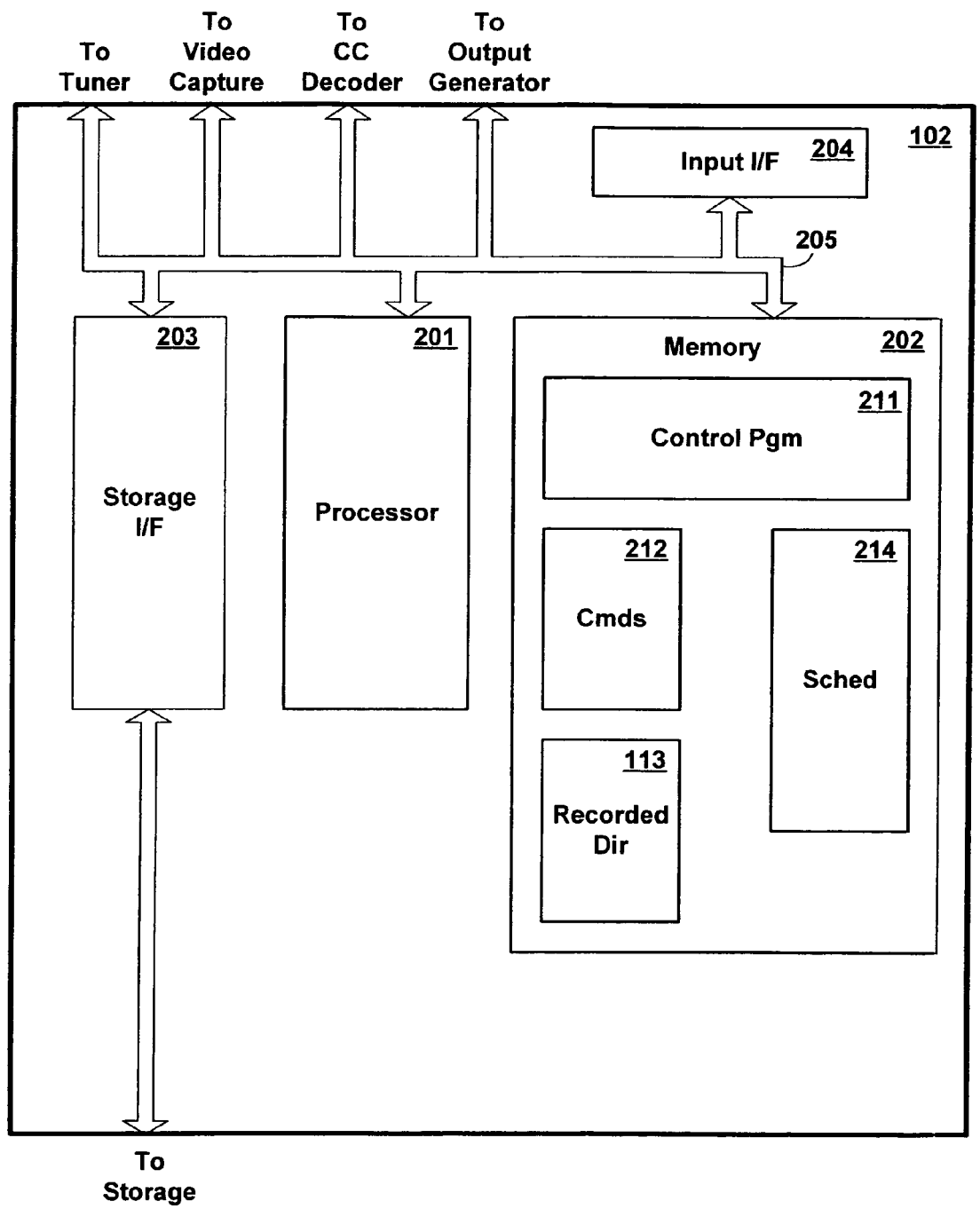
FIG. 2 is a high-level representation of the major hardware components of a controller for a video recording system, according to the preferred embodiment.

FIG. 2 is a high-level representation of the major hardware components of controller 102, according to the preferred embodiment. Controller 102 contains programmable processor 201, random access memory 202, storage device interface 203, and user input device interface 204. These components as well as tuner 103, video capture 104, closed captioning decoder 105, and output generator 106 are coupled for communication by one or more internal buses, represented generally as feature 205, it being understood that bus 205 is a high-level conceptual view of a digital communications medium, and that the internal bus may in fact be any of various configurations. Bus 205 could be a single multi-drop bus, but could also be multiple buses arranged in any of various topologies, such as point-to-point links in hierarchical, star or web configurations, parallel and redundant paths, and so forth, and that separate buses may exist for communicating certain information, such as addresses or status information.

Processor 201 comprises one (or optionally multiple) general-purpose programmable processors, executing instructions stored as a control program 211 in memory 202. Memory 202 is preferably a random-access semiconductor memory for storing digital data, including executable instructions. Memory 202 is conceptually represented as a single monolithic entity, it being understood that memory is typically implemented as multiple physical memory modules, and that memory may be arranged in a hierarchy of caches and other memory devices. At least part of memory 202 is preferably volatile dynamic random access memory capable of being written to an indefinite number of cycles, but a portion of memory 202 (such as that portion storing control program 211) could be a read-only memory or a flash memory having a limited number of write cycles, and which retains its contents in the absence of power.

Storage interface 203 supports bidirectional communication with the storage device or devices 107. Communications with storage 107 include not only the storage of digitized television signals but other data as well, including in particular closed captioning text stream data, as explained further herein. Storage interface 203 typically contains a buffer for supporting communications with storage 107.

User input device interface 204 supports communication with the user input device or devices. Where the user input device is a hand-held device communicating over an infra-red link, interface 204 includes an infra-red receiver and additional hardware necessary for decoding and buffering the incoming infra-read signals. In the case of other input devices, interface 204 includes appropriate hardware for receiving input from the devices.

Several data entities are present within memory 202, some of which are illustrated in FIG. 2. As shown in FIG. 2, memory 202 contains a resident control program 211, a record command table 212 containing one or more record command entries, recorded segments directory 213, and television schedule 214. Memory 202 will may contain additional data entities, not necessary for an understanding of the present invention, such as state data for control program operation, buffers, and so forth.

Control program 211 is a program containing a plurality of processor-executable instructions which, when executed on processor 201, control the operation of video recording device 101. Control program is preferably resident in a non-volatile portion of memory 202. However, a control program may contain such a large variety of functions that it is impractical or undesirable to maintain the entire program resident in memory 202 at all times, and in this case some portion of control program can be resident in non-volatile memory, while another portion (e.g., less frequently used functions) might be stored in storage 107, and loaded into memory 202 as needed. Control program 211 performs functions typical of a video recording device, such as interfacing with the viewer to receive viewer commands, controlling the operation of tuner 103 to tune the correct channel, storing and retrieving data, including representations of a television signal, in storage 107, outputting data to output generator 106, and so forth. Among the functions performed by control program 211 is the scheduled recording of selective television programs, and in particular the selection of programs for recording based on a determination whether a particular program episode duplicates a previously recorded program episode, as described more fully herein.

Record command table 212 contains commands issued by the viewer to record television segments, as more fully explained herein. Recorded segments directory 213 is a table containing entries corresponding to television segments that have previously been recorded by recording device 101. Television schedule 214 contains television broadcast scheduling information, i.e., information concerning the date, time and channel of various program instances recently broadcast or to be broadcast in the near future.

It should be understood that FIGS. 1 and 2 are intended to depict the representative major components of a television recording and presentation system 100 at a high level, that individual components may have greater complexity than represented FIGS. 1 and 2, and that the number, type and configuration of such functional units and physical units may vary considerably. It will further be understood that not all components shown in FIG. 1 or 2 may be present in a particular television system, and that other components in addition to those shown may be present.

Figure 3:
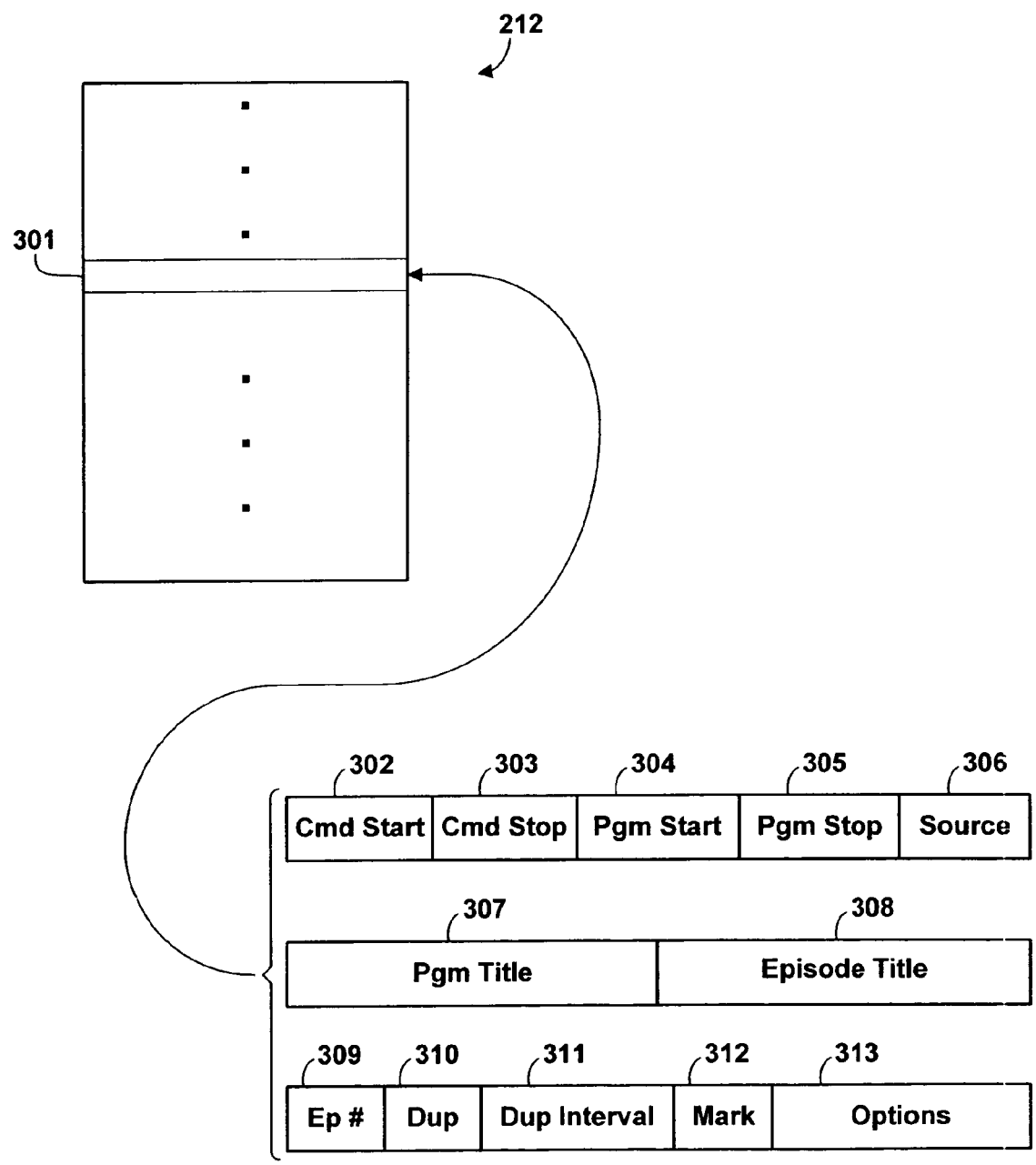
FIG. 3 is a conceptual representation of a record command table, according to the preferred embodiment.

FIG. 3 is a conceptual representation of record command table 212, according to the preferred embodiment. Record command table 212 contains a variable number of record command entries 301, each entry specifying the parameters of a television segment or segments to be recorded by video recorder 101. As shown in FIG. 3, each entry contains a command start date/time 302, a command stop date/time 303, a program start day/time 304, a program stop day/time 305, a signal source 306, a program title 307, an episode title 308, an episode number 309, a duplicate record flag 310, and a duplicate record interval 311, and a mark mismatch flag 312. Each entry may contain additional information concerning the recording parameters, represented generally as options field 313. For example, the user might specify other selection criteria for selecting a program to record, a recording format, a recording destination (if multiple storage destinations are possible), etc.

Command start date/time 302 and command stop date/time 303 specify the beginning and end, respectively, of a time interval during which the command is effective. The control program will not record anything outside the specified time interval. Either or both command start date/time 302 and command stop date/time 303 may be wildcard values, meaning that no limit on the time interval is imposed. Program start day/time 304 and program stop day/time 305 specify a time interval for recording as a day of week and time of day, and may also contain wildcard values. Program start day/time 304 and program stop day/time 305 are used primarily for recording multiple programs on a weekly periodic basis, at the same day and time each week; where only a single instance of a program at a known time is to be recorded, command start date/time 302 and command stop date/time 303 are sufficient to specify the recording interval, and program start day/time 304 and program stop day/time 305 are not used.

Signal source 306 specifies the source of a television signal to be recorded, which is generally a broadcast channel, although depending on the design of video recorder 101, it could be an auxiliary input. Signal source could also contain a wildcard value, indicating that any program meeting the specified parameters is to be recorded, regardless of the source (channel) of the program.

Program title 307, episode title 308, and episode number 309 specify the respective parameters of a program instance to be recorded. These are typically used as an alternative to specifying the time and source of a television program, where the viewer wishes to record all programs of a particular type, regardless of source or time of broadcast. Any or all of these values may be wildcards. The viewer may specify only a program title (such as the title of a series) which applies to multiple episodes of the same program, or may specify both the title of the program and the episode title or episode number.

Duplicate flag 310 specifies whether duplicates are to be recorded. If duplicate flag is set, then the control program will record any program instance satisfying the parameters of the command, regardless of the number of times it has previously been recorded. If duplicate flag 310 is not set, then the control program will not record (or will discontinue recording and erase) a program instance which duplicates another program instance recorded within the time period specified by duplicate record interval 311. Duplicate time interval 311 allows the viewer to limit the suppression of duplicates to a particular recent interval, Duplicate record interval may be a wild card, indicating that no duplicates should be recorded regardless of the length of time since the last duplicate was recorded. In the preferred embodiment, duplicate flag is set off by default, and duplicate record interval is set to some appropriate period, such as 28 days, these values being changeable by the viewer.

Mark mismatch flag 312 specifies whether any mismatched segments should be marked. When flag 312 is set, the control program marks any portions of the originally recorded program instance which do not precisely match corresponding portions of a subsequent program instance determined to be a duplicate. Any such mismatched portions are assumed to be commercial advertisements, which the viewer may wish to skip when playing the recorded program. In the preferred embodiment, these mismatched portions are simply marked, rather than actually deleted, and the viewer must take some action at the time the recorded program is played to suppress playing of the portions thus marked. Marking is preferred over deletion on the theory that a viewer may actually wish to see some of these advertisements, that the control program might occasionally incorrectly mark something, and because automated deletion from the copy may raise copyright issues. However, in an alternative embodiment the control program might automatically delete such mismatched portions.

Figure 4:
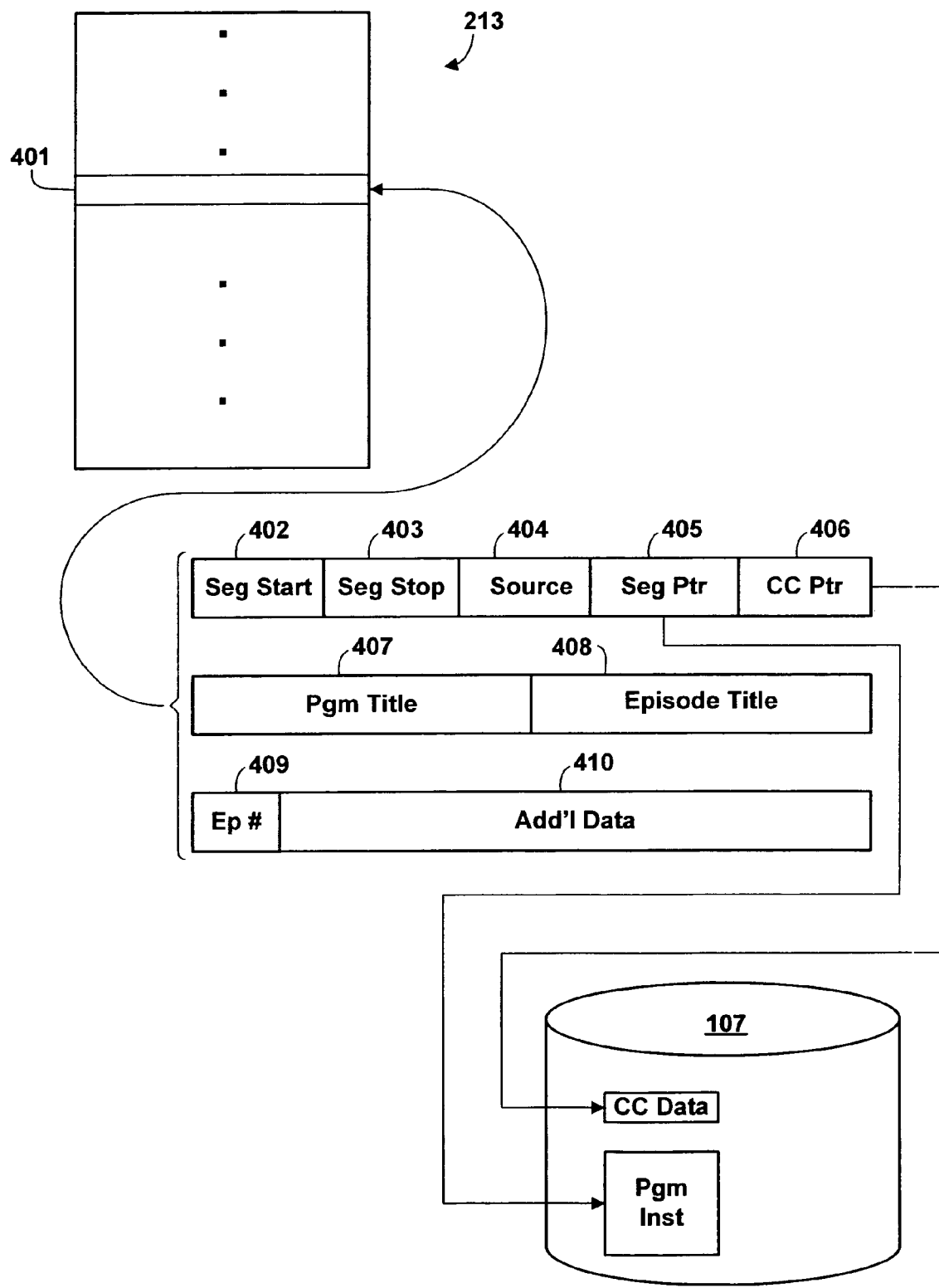
FIG. 4 is a conceptual representation of a recorded segments directory, according to the preferred embodiment.

FIG. 4 is a conceptual representation of recorded segments directory 213, according to the preferred embodiment. Recorded segments directory 213 contains a variable number of recorded segment entries 401, each entry corresponding to a respective instance of television programming which has already been recorded by recording device 101, and identifying the recorded instance in sufficient detail. As shown in FIG. 4, each entry contains a recorded segment start date/time 402, a recorded segment stop date/time 403, a recorded segment source 404, a segment pointer 405, a closed captioning (CC) pointer 406, a program title 407, an episode title 408, and an episode number 409. Each entry 401 may contain additional information concerning the recorded segment, represented generally as additional data field 410.

Recorded segment start date/time 402 and recorded segment stop date/time 403 contain the start and stop time, respectively, at which the corresponding television segment was recorded. Recorded segment source 404 contains the source (generally, a channel number) of the television signal which was recorded. Program title 407, episode title 408 and episode number 409 contain the respective values for the recorded segment, if these values were available when the segment was recorded. I.e., if electronic television scheduling information available to the control program provided these values, then they are saved with the recorded segment in the corresponding fields of the recorded segment entry. In some cases, scheduling information may not be available or may be incomplete, in which case a suitable blank value, indicating that the value is unknown, is entered in the corresponding field.

Segment pointer 405 contains a designation of the location at which the recorded segment was recorded, such as an address in storage device 107. I.e., the location indicated by segment pointer 405 is the location of the stored rendition of the television signal for the recorded segment itself. As explained previously, this television signal may be converted to some form suitable for storage, which may involve a compression algorithm. By retrieving the data at the location indicated by segment pointer 405, the video recording device can replay the entire recorded program instance.

Closed captioning pointer 406 contains a designation of the stored location of the closed captioning text stream corresponding to the recorded segment. The closed captioning text stream is textual data rendered by closed captioning decoder 105. This text stream is preferably stored independently of the converted television signal itself, and is used by the control program for determining whether a program instance has already been recorded, as explained herein. The closed captioning text stream might be stored at an independent location in the same storage device as the corresponding recorded segment, or might be stored in a different storage device. For example, where the recorded segments are stored in removable media, it is preferable to store the closed captioning stream in a more accessible location, such as an integral fixed rotating magnetic hard disk drive. The fact that the closed captioning stream is independently stored does not necessarily mean that it is removed from the converted television signal stored at the location indicated by segment pointer 405. The storage of a separate text version of the closed captioning stream is performed so as to be able to readily access the text stream for matching purposes. The converted television signal recorded at the location indicated by segment pointer 405 may still contain the original closed captioning data embedded in the television signal.

Figure 5:
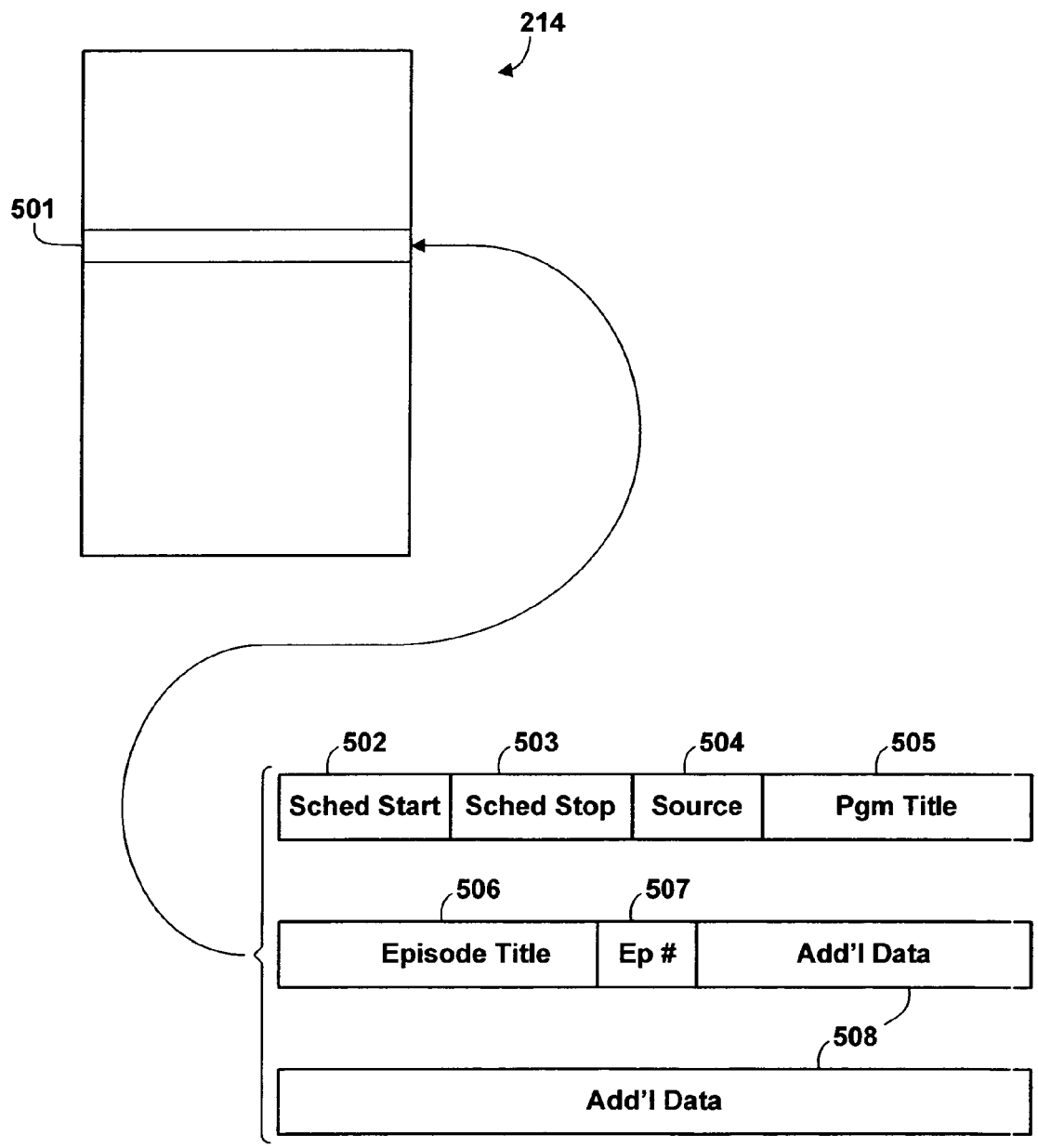
FIG. 5 is a conceptual representation of television schedule 214, according to the preferred embodiment.

FIG. 5 is a conceptual representation of television schedule 214, according to the preferred embodiment. Television schedule 214 contains a variable number of broadcast scheduling entries 501, each entry corresponding to a respective scheduled program instance to be broadcast (or recently broadcast). Television schedule 214 preferably is a rendition of electronic television scheduling information which is broadcast by a television service provider and saved in recording device 101. Such scheduling information is intended for display to the viewer, to allow the viewer to make selections concerning programs to be viewed and/or recorded. At least some of the scheduling information is also used by the control program to automatically identify programs to be recorded, as described more fully herein. When scheduling information is received by recording device 101, control program 211 formats the broadcast data in memory according to the data structure represented in FIG. 5. As shown in FIG. 5, each entry contains a scheduled instance start date/time 502, a scheduled instance stop date/time 503, a scheduled instance 504, a scheduled program title 505, a scheduled episode title 506, and a scheduled episode number 507. Each entry 501 may contain additional information concerning the scheduled program instance, represented generally as additional data field 508. For example, additional data 508 may contain a program description, a rating, or similar information which may be useful to display to the viewer when making program choices, but which are not necessary to the operation of the present invention.

Although record command table 212, recorded segments directory 213 and television schedule 214 are represented in FIGS. 3, 4 and 5 and described herein as tables or array type structures, this representation is not meant to imply that the data is stored in a contiguous array of address locations, or any particular structure of the data. The data may be structured according to any convenient format, and the three different entities need not use the same structure. For example, the data could be structured as a linked list. Record command table 212, recorded segments directory 213 and/or television schedule 214 may contain other elements, such as headers, pointers, and so forth, for maintaining and accessing data therein.

Video recorder 101 receives input from a viewer via input device 111. Preferably, video recorder can present the viewer with an interactive input interface, whereby a menu of choices and additional information is displayed on display 110, and viewer selections are echoed received via input device 111 are echoed to display 110, as is well-known in the art. Among the selections possible, the video recorder may allow the user to designate any of the various parameters of a command entry 301. Such a designation can be by manual entry of the individual parameters, but can also be by interactively displaying television scheduling data from schedule 214, and allowing the viewer to select a scheduling entry. When selecting a scheduling entry, the viewer will be prompted whether to repeat the recording on a weekly basis, whether to record other episodes having the same title, whether to record duplicates, whether to mark mismatched text, and so forth. The control program then builds a command entry in command entry table 212 from the viewer's input.

Video recorder 101 can be placed in any of multiple states or operational modes. For example, it can be placed in a pass-through mode in which it merely passes a television signal through to television display 110, without recording the signal; it can be placed in a manual recording mode, in which it records the content of a channel specified by the viewer in response to the viewer's start and stop commands; and so forth. In particular, the recorder can be placed in an automated recording mode, wherein it records television broadcasts automatically and unattended based on previous input of the viewer.

Figure 6:
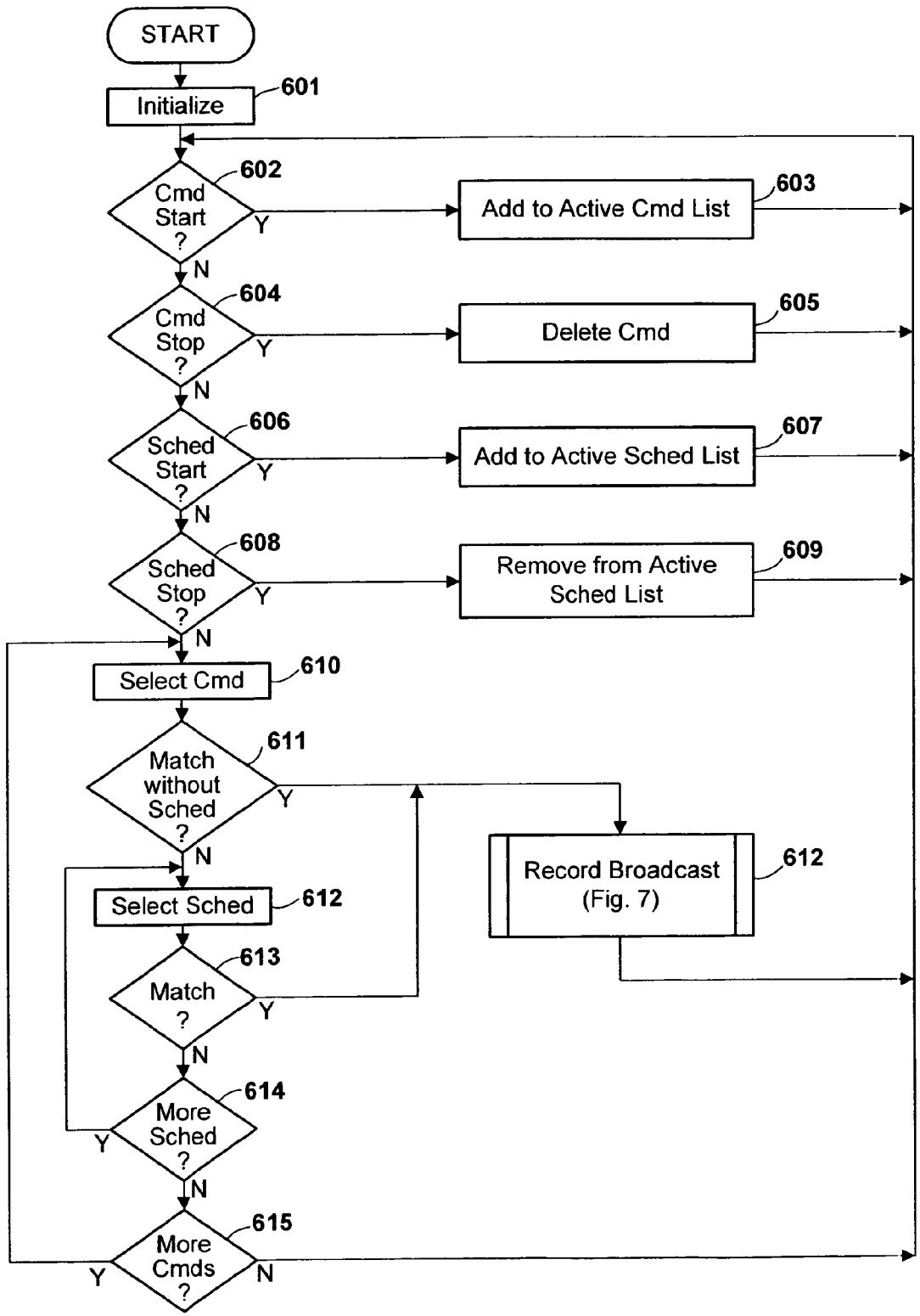
FIGS. 6 is a high-level flow diagram showing the operation of a control program of a recoding device in monitoring for an automated recording event, according to the preferred embodiment.
Figure 7A:
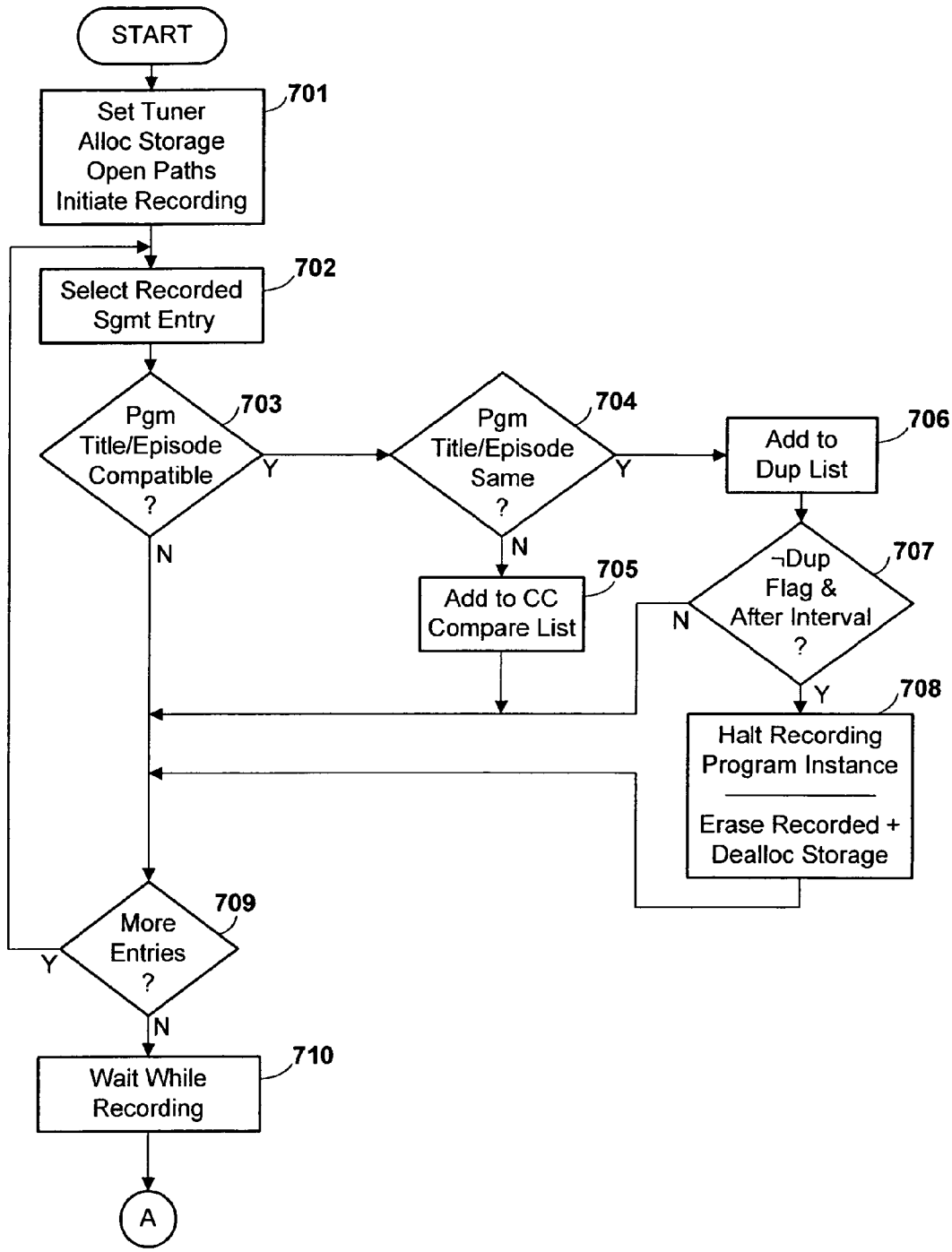
FIGS. 7A and 7B (herein collectively referred to as FIG. 7) are a flow diagram representing in greater detail the process of recording a broadcast and determining whether the broadcast is a duplicate of a previously recorded program instance, according to the preferred embodiment.
Figure 7B:
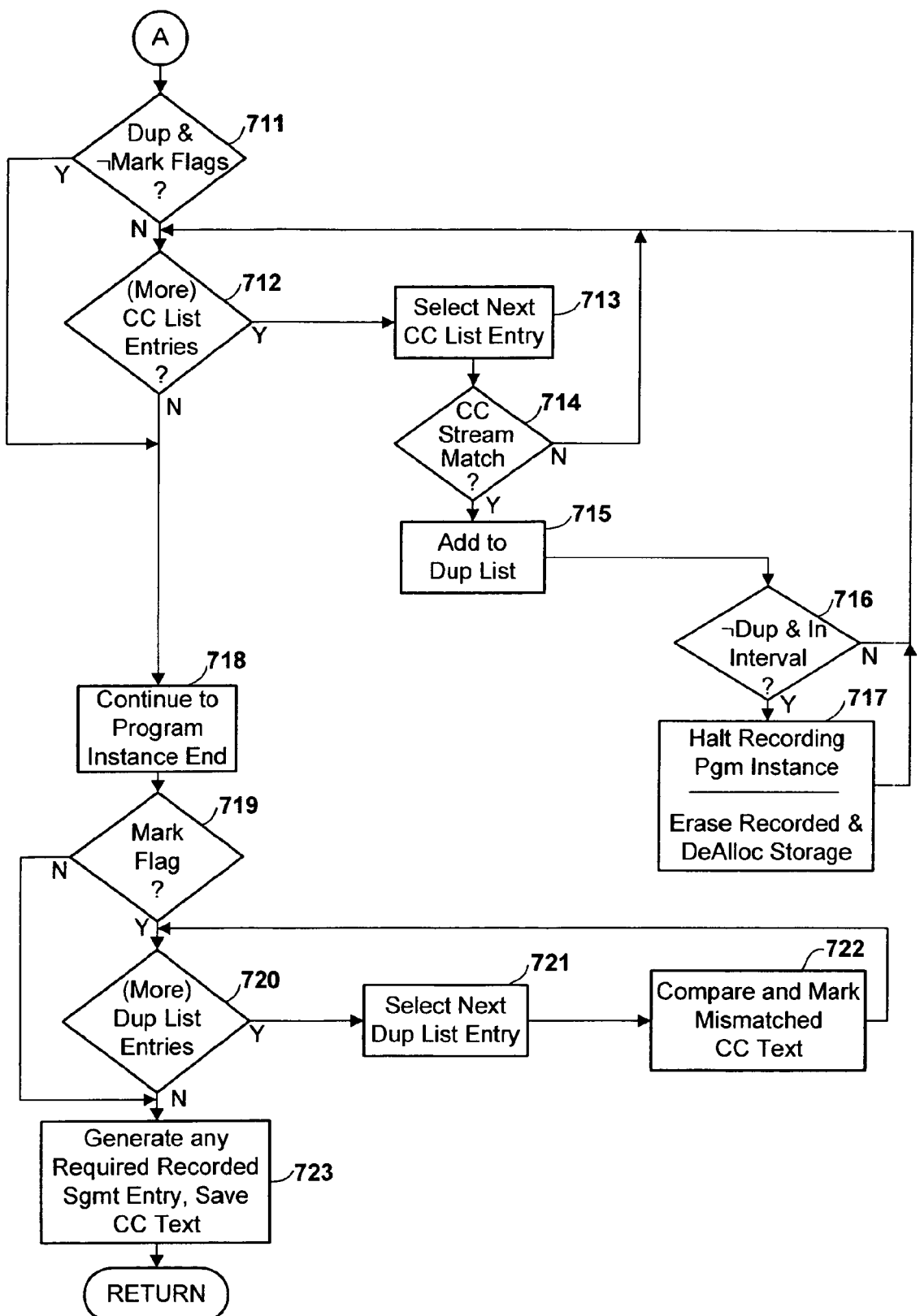

FIGS. 6, 7A and 7B are flow diagrams showing the operation at a high level of control program 211 when operating in an automated recording mode to record television broadcasts according to previously specified scheduling parameters, according to the preferred embodiment. FIG. 6 shows at a high level the process of monitoring for a triggering event indicating that recording of a television broadcast should commence. FIGS. 7A and 7B (herein collectively referred to as FIG. 7) show in greater detail the process of recording the broadcast, and in particular the process of determining whether the broadcast is a duplicate of a previously recorded instance of a program.

Referring to FIG. 6, in automated recording mode the control program maintains several temporary lists, in particular an active commands list and an active scheduled broadcasts list. When entering automated recording mode, the control program initializes its state, and in particular initializes these lists to null values (step 601). The control program then reviews all commands in record command table 212 which are not already in the active commands list. If the command start date/time (from field 302) has passed (step 602), the command is added to the active commands list (step 603). The control program then reviews all commands in the active commands list for any commands which have expired. With respect to any command which has expired, i.e., the command stop date/time (from field 303) has passed (step 604), the command is removed from the active commands list and deleted from record command table 212 (step 605). The control program then similarly reviews all scheduled entries in television schedule 214. With respect to any entry not already in the active scheduled broadcast list, for which the scheduled start date/time (from field 502) has passed (step 606), the entry is added to the active scheduled broadcast list (step 607). The control program then reviews all scheduling entries in the active scheduled broadcast list for any entries which have expired. With respect to any command which has expired, i.e., the scheduled stop date/time (from field 503) has passed (step 608), the scheduling entry is removed from the active scheduled broadcast list (step 609). The entry may be removed from schedule 214 at this time, or may be retained for informational purposes.

The control program then attempts to determine whether any command is ripe for initiating a recording event. A next command on the active command list is selected (step 610). The command is examined to determine whether its conditions are met independently of television scheduling information (step 611). I.e., a command may simply specify that whatever is on a particular channel at a particular time be recorded, without specifying the program title or similar information from schedule. If such a condition is met, the 'Y' branch is taken from step 611, and the control program initiates recording of the program. Recording is represented generally as step 616 in FIG. 6, and is shown in greater detail in FIG. 7.

If a match condition can not be determined without scheduling information, the control program examines each scheduling entry in schedule 214 to determine whether any entry matches the selected command. I.e., a next scheduling entry from active schedule broadcast list is selected (step 612), and the appropriate fields of the entry (program title, episode title, and episode number, source) are compared with corresponding fields of the selected command entry. A "match" means either that the values in corresponding fields of a pair are identical, or the field from the selected command entry contains a wild card value. If the selected command entry matches the selected scheduling entry, the 'Y' branch is taken from step 613, and recording of the program is initiated at step 616. If not, the next scheduling entry is selected for comparison. When all scheduling entries have been compared, the 'N' branch is taken from step 614. If any more commands remain in the active commands list (the 'Y' branch rom step 615), the next command is selected for analysis (step 610). When all commands have been thus analyzed without finding something to record, the 'N' branch is taken from step 615, and the control program returns to the beginning of the monitoring loop at step 602.

FIG. 7 shows in greater detail the automated recording performed by the control program when a command entry it triggered to record. Referring to FIG. 7, upon triggering the command, the control program directs tuner 103 to tune to the source specified in source field 306 of the command entry, or if no source is specified in the command entry 301, to the source specified in source field 504 of the scheduling entry 501. The control program further allocates space in storage 107 for the program instance to be recorded, initializes state parameters and opens communications paths for transferring incoming television signals from video capture unit 104 to storage 107. Various components of recording device 101 thereupon commence recording of the incoming television signal on the selected channel, and separately saving the closed captioning stream for later analysis. These steps are represented generally as block 701.

While recording, the control program begins a check for previously recorded duplicates of the program instance being recorded by reviewing the recorded segment directory 213. The control program selects an entry from the recorded segment directory 213 (step 702). The control program compares the program title, episode title and episode number (fields 407, 408 409) of the selected recorded entry with the program title, episode and episode number (from fields 505, 506, 507 of the scheduling entry) of the program instance being recorded, shown as steps 703 and 704. There are three possible outcomes to this comparison. The first is that the entries are incompatible, i.e. they are not the same program instance (the 'N' branch from step 703). This could be either because the program titles are given and are not the same, or the episodes are given and are not the same. In this case, no action is taken, and the control program proceeds to step 709. The second possibility is that the entries are compatible, but it can not be determined that they represent the same program instance due to incomplete information (the 'N' branch from step 704). This could be the case, e.g., if the program tiles are the same, but no episode title or episode number is provided in one or both of the entries. The criteria used for determining compatibility may vary. In this case, the selected recorded segment entry is added to the CC compare list (step 705), and the control program proceeds to step 709. The CC compare list will be later used to compare closed captioning streams from the program instances in order to make a determination whether the program instances are the same program and episode. The third possibility is that the entries are compatible and do indeed represent the same program and episode, where such information is provided (the 'Y' branch from step 704). In this case, the selected recorded segment entry is added to a duplicate list (step 706). If the duplicate flag 301 indicates that duplicates are not to be recorded and the selected recorded segment entry represents a segment recorded before the duplicate interval specified in field 311, then the 'Y' branch is taken from step 707; the control program halts further recording of the current program instance, deletes any portion already recorded and deallocates storage (step 708). However, the control program will continue to collect closed captioning data if mark mismatch flag 312 indicates that certain portions of the program (assumed to be commercials) are to be marked. Collecting closed captioning data could optionally be performed at a low priority while the recorder performs some other task, such as recording a different program instance. The control program then proceeds to step 709.

If more entries remain in the recorded segments directory 213 (the 'Y' branch from step 709), the control program returns to step 702 to select a next entry for analysis. When all entries have been analyzed, the control program takes the 'N' branch from step 709.

The control program might alternatively perform most or all of the steps represented as steps 702-709 before commencing recording of the program, shown as step 701. In this case, if a duplicate is definitely found (the 'Y' branch from step 704), it is not necessary to halt recording or erase anything, but the control program will continue to collect closed captioning data if the mark mismatch flag 312 is set.

The control program then waits until a sufficiently long portion of the program instance has been recorded (step 710). The length of time waiting at step 710 is sufficiently long to permit a meaningful comparison of the closed captioning streams. Because there is no requirement that comparison of the closed captioning streams be performed in real time, the control program could simply wait until the end of the broadcast program instance, although in the preferred embodiment the period is shorter, e.g. 10 minutes.

The control program them compares closed captioning streams to detect duplicates. If duplicate flag 310 is set and mark mismatch flag 312 is not set, then it is not necessary to detect duplicates, and the 'Y' branch is taken from step 711 to by-pass steps 712-717. Otherwise, the control program continues to step 712. If there is at least one entry on the CC compare list (the 'Y' branch from step 712), the next entry is selected (step 713). The control program retrieves closed captioning text corresponding to the selected entry at the location indicated by CC pointer 406. This closed captioning stream is compared to the closed captioning stream of the program instance currently being recorded to detect a match (step 714).

In comparing closed captioning streams at step 714, the control program is looking for an exact match of the two text streams, occurring anywhere within the programs and having a pre-established minimum length. Length is preferably a length of time, such as 5 minutes, but could also be a length in number of words or some other measure. The pre-established minimum length should be sufficiently long to assure that a commercial advertisement or an opening sequence of a serial program will not be interpreted as a duplicate program instance (or make it very unlikely). However, the length should not be so long as to generally include commercial interruptions, for in that case two segments of the same program episode are not likely to be identical. To simplify the comparison process and avoid matching fragments of common words, comparison is preferably done on a sentence-by-sentence basis. I.e, a first sentence is selected from the currently broadcast program and compared with successive sentences of a previously recorded program instance. If no match is found, a next sentence from the currently broadcast program is compared, and so on. If an exact match is found, the immediate succeeding sentences are compared, until either the minimum length is reached or the sentences miscompare. A simple comparison of text streams over an interval of several minutes will generally be sufficient to determine whether two program instances are duplicates. However, alternative comparisons could be used for additional certainty. For example, the control program could look for two exact matches of the text streams separated by a commercial interruption.

If the closed captioning streams match to some pre-established criteria as explained above, the 'Y' branch is taken from step 714. The entry from the CC compare list is then added to the duplicate list (step 515). If the duplicate flag 301 is not set and the selected recorded segment entry represents a segment recorded before the duplicate interval specified in field 311, then the 'Y' branch is taken from step 716; the control program halts further recording of the current program instance, deletes any portion already recorded and deallocates storage (step 717). However, the control program will continue to collect closed captioning data if mark mismatch flag 312 indicates that certain portions of the program (assumed to be commercials) are to be marked. Steps 716 and 717 are similar to steps 707 and 708, respectively. The control program then returns to step 712.

When all entries in the CC compare list have been thus analyzed, the 'N' branch is taken from step 712. The recorder then continues to record the program until the appropriate stop time is encountered, at which point the control program automatically discontinues recording, if recording was not previously discontinued, and discontinues collecting closed-captioning text (step 718).

If mark mismatch flag 312 is not set, the 'N' branch is taken from step 719 to by-pass steps 720-722. Otherwise, the control program compares and marks any mismatched portions of duplicates. Specifically, if there are any entries on the duplicate list (indicating a previously recorded program instance which is a duplicate of the currently recorded instance), the 'Y' branch is taken from step 720, and an entry is selected (step 721). The entire closed captioning text of the selected entry is then compared with the closed captioning text of the program instance just recorded, and any portions which miscompare are marked as probable commercial advertisements in the previously recorded program instance (step 722). If the current program instance is also being saved (i.e., the duplicate flag 310 indicates that duplicates should be recorded), then the miscompares are also marked in the currently recorded program instance. Comparison is preferably performed on a sentence-by-sentence manner as described previously with respect to step 714.

In the preferred embodiment, recorded program segments which miscompare are marked rather than automatically deleted. Marking merely means that some form of data is associated with the recorded program instance to indicate that a portion thereof is probably a commercial advertisement. The mark may be in the closed captioning stream data, the digitized recorded program instance, or in a separate record of marked portions. When the recorded program instance is again played, the control program accesses the marking data and performs some automated action in response thereto. Preferably, the control program asks the viewer whether the viewer wishes to suppress showing of the marked portions, and responds according to the viewer's selection. The viewer's selection can be either a global selection applicable to all marked portions in a program instance, or the viewer can select each marked portion individually. However, in an alternative embodiment, the control program automatically deletes the mismatched portions at the time the mismatch is detected (i.e. step 722), rather than mark the mismatched portions.

When all duplicate list entries have been thus compared, it being understood that there could be multiple duplicate list entries, the 'N' branch is taken from step 720. If the currently recorded program instance is to be saved (either no duplicate was detected, or the duplicate flag 310 indicates duplicates should be saved), the control program then generates an appropriate entry for the currently recorded program instance in directory 213 and saves the closed captioning text. The control program then returns to step 602.

Although a particular sequence of steps has been described herein as a preferred embodiment, it will be appreciated by those skilled in the art that a control program for controlling the operation of a recording device in accordance with the present invention could employ different sequences of comparisons and determinations, and may use different data structures from those described. Furthermore, although as described above a determination whether a current program instance duplicates a previously recorded program instance is made in real time while the current program instance is being received, it would alternatively be possible to record the entire current program instance and to make a duplicate determination after recording is finished, taking some action with respect to recording (e.g., erasing a duplicate) after the broadcast is completed.

In general, the routines executed to implement the illustrated embodiments of the invention, whether implemented within recorder 101 or externally, as part of an operating system or a specific application, program, object, module or sequence of instructions are referred to herein as "programs" or "control programs". The programs typically comprise instructions which, when read and executed by one or more processors in the devices or systems consistent with the invention, cause those devices or systems to perform the steps necessary to execute steps or generate elements embodying the various aspects of the present invention. Moreover, while the invention has and hereinafter will be described in the context of fully functioning television recording apparatus or other systems, the various embodiments of the invention are capable of being distributed as a program product in a variety of forms, and the invention applies equally regardless of the particular type of signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network, including a wireless network. Examples of signal-bearing media are illustrated in FIG. 1 as storage 107, and in FIG. 2 as memory 202.

A particular embodiment and alternatives of the invention have been disclosed herein. Additionally, it has been disclosed that certain aspects of the preferred embodiment might be differently implemented, without necessarily describing in detail each possible alternative implementation. In addition to any variation or alternative above disclosed, the following alternatives or variations are possible within the scope of the present invention.

In the embodiments described above, it is assumed that the closed captioning text streams contain nothing more than text which is a rendition of the spoken dialogue of a television program, and sometimes contain descriptions of background sounds. This embodiment is preferred because it is capable of operation using information currently available, and does not depend on broadcasters to place additional data in the closed captioning stream which is not already there. However, a closed captioning stream might contain additional data, which could be useful for determining whether particular program instances match, including in particular data which is deliberately inserted in the closed captioning stream for this specific purpose. I.e., a closed captioning stream may contain comments and other data which is not intended to be a rendition of the spoken dialogue or soundtrack. Such comments could include a unique identifier for each program and episode, which might be identified by special characters, word or letter combinations, so that it would only be necessary to compare these values. Such an identifier might be a specially assigned identifier according to some universal naming convention (yet to be established), or could be the program title, episode title and/or episode number. Other data might similarly be inserted for other purposes, but which would nevertheless be useful in identifying program episodes as described herein.

In the preferred embodiment described above, it has been assumed for clarity of description that tuner 103 is capable of tuning only a single channel signal at a time. However, as is known, conventional hardware exists for tuning multiple channels simultaneously, and recorder 101 may be constructed so as to tune multiple channels and perform separate tasks with respect to each. For example, it may transmit one signal to television display monitor 110 while simultaneously recording a program on a different channel. The recorder may be constructed to monitor and/or record multiple channels simultaneously. For example, monitoring a closed captioning stream requires relatively little processing capability because the actual amount of text data in the stream is small. If the controller determines that an episode is a duplicate, it could continue to gather closed captioning data at a low priority (e.g., for purposes of marking mismatched sections of a previously recorded program instance) while simultaneously recording another program. In some embodiments, a recording system may have the capability to compare closed captioning streams from two programs being broadcast simultaneously to determine whether they are duplicates of each other. Additional multitasking examples are possible.

Although a specific embodiment of the invention has been disclosed along with certain alternatives, it will be recognized by those skilled in the art that additional variations in form and detail may be made within the scope of the following claims:

What is claimed is:

1. A method for recording television programming, comprising the steps of:
   recording a plurality of television program instances on recording media;
   automatically comparing a closed captioning stream from a first television program instance with a respective closed captioning stream from each of at least one additional television program instances; and
   if said closed captioning stream from said first television program instance matches a respective closed captioning stream from a second television program instance according to at least one pre-established criterion, said second television program instance being one of said additional television program instances, then automatically identifying a respective selective portion of at least one of said first television program instance and said second television program instance corresponding to one or more portions of said closed captioning stream from said first television program instance which do not match corresponding one or more portions of said closed captioning stream from said second television program instance, each respective selective portion being at least some and less than all of the respective television program instance, and with respect to each said respective selective portion, automatically taking at least one action distinguishing the respective selective portion from that portion of the respective television program instance not within the respective selective portion.

2. The method of claim 1, further comprising saving a recorded version of only one of said first and second television program instances and deleting any recorded portion of the unsaved one of said first and second television program instance from said recording media.

3. The method of claim 1, wherein said at least one action distinguishing the respective selective portion from than portion of the respective television program instance not within the respective selective portion further comprises marking any portions of said closed captioning stream identified by said identifying step.

4. The method of claim 1, wherein said at least one action distinguishing the respective selective portion from than portion of the respective television program instance not within the respective selective portion further comprises deleting the respective selective portion from said recording media and not deleting that portion of the respective television program instance not within the respective selective portion.

5. The method of claim 1, further comprising the steps of:
   receiving electronically encoded television scheduling data; and
   automatically comparing electronically encoded scheduling data associated with said first television program instance with respective electronically encoded scheduling data associated with each of said at least one additional television program instances;
   wherein said step of automatically identifying a respective selective portion of at least one of said first television program instance and said second television program instance is taken responsive to said step of automatically comparing electronically encoded scheduling data and said step of automatically comparing a closed captioning stream from a first television program instance with a respective closed captioning stream from each of at least one additional television program instances.

6. The method of claim 1, wherein said automatically comparing step comprises automatically comparing closed captioning text representing spoken dialogue of said first television program instance with respective closed captioning text representing respective spoken dialogues of each of at least one additional television program instances.

7. The method of claim 1, wherein said automatically comparing step is performed concurrently with receiving a broadcast of said first television program instance.

* * * * *